United States Patent
Lowen et al.

(10) Patent No.: US 7,313,864 B2
(45) Date of Patent: Jan. 1, 2008

(54) METHOD FOR PRODUCING A RUN-FLAT SUPPORT BODY FOR RUN-FLAT VEHICLE WHEELS

(75) Inventors: Jakob E. Lowen, Gummersbach (DE); Meinolf Koch, Bergneustadt (DE); Ralf Kulmann, Olpe-Rehringhausen (DE); Christian Reuber, Droishagen (DE); Lutz Maiwald, Bergneustadt (DE)

(73) Assignee: ISE Innomotive Systems Europe GmbH (DE)

( * ) Notice: Subject to any disclaimer, the term of this patent is extended or adjusted under 35 U.S.C. 154(b) by 582 days.

(21) Appl. No.: 10/491,604

(22) PCT Filed: Sep. 10, 2002

(86) PCT No.: PCT/EP02/10115

§ 371 (c)(1),
(2), (4) Date: Sep. 16, 2004

(87) PCT Pub. No.: WO03/031209

PCT Pub. Date: Apr. 17, 2003

(65) Prior Publication Data

US 2005/0028367 A1 Feb. 10, 2005

(30) Foreign Application Priority Data

Oct. 5, 2001 (DE) .............................. 101 49 086

(51) Int. Cl.
*B21K 1/38* (2006.01)
(52) U.S. Cl. .............................. 29/894.354; 29/894.35; 29/894.351; 29/894.37; 152/520; 152/158
(58) Field of Classification Search .......... 29/894.354, 29/894.35, 894.351, 894.37; 152/158, 520, 152/156
See application file for complete search history.

(56) References Cited

U.S. PATENT DOCUMENTS 999,085 A 7/1911 Ball (Continued)

FOREIGN PATENT DOCUMENTS

DE 236064 6/1911

(Continued)

OTHER PUBLICATIONS

"Extended Mobility Systems", Lecture, J. Buschmann/H. Rubba, Entwicklungsstatus Conti Safety Ring (CSR) Oct. 10, 2000 in Jeversen, Germany, no translation.

*Primary Examiner*—David P. Bryant
*Assistant Examiner*—Sarang Afzali
(74) *Attorney, Agent, or Firm*—Hudak, Shunk & Farine Co. LPA (57) ABSTRACT

A run-flat support body for run-flat vehicle wheels. The support body is typically embodied as a shell-shaped, metallic annular body having an undulated supporting annular surface. A simple, effective method for producing one such annular body, according to which a rectangular blank which is cut out of a strip of sheet metal is bent along the longitudinal side to form a ring and the open ends of the ring are interconnected by a material connection. The annular blank thus produced is provided with the desired profile according to the pressure-rolling method, is provided with connecting elements, and cut open between the same.

23 Claims, 7 Drawing Sheets

U.S. PATENT DOCUMENTS

| | | |
|---|---|---|
| 1,041,062 A | 10/1912 | Funk |
| 1,117,163 A | 11/1914 | Bryant |
| 6,026,667 A | 2/2000 | Takamoku |
| 6,189,357 B1 | 2/2001 | Baumgarten et al. |
| 6,705,368 B2 | 3/2004 | Glinz et al. |

FOREIGN PATENT DOCUMENTS

| | | |
|---|---|---|
| DE | 197 07 090 | 8/1998 |
| DE | 197 45 409 | 4/1999 |
| DE | 10130291 A1 | 1/2003 |
| EP | 0 980 771 A2 | 2/2000 |
| EP | 980 771 | 2/2000 |

METHOD FOR PRODUCING A RUN-FLAT SUPPORT BODY FOR RUN-FLAT VEHICLE WHEELS

FIELD OF INVENTION

The invention relates to a method for producing a run-flat support body in the form of a shell-type annular metal body with an undulated annular supporting surface for run-flat vehicle wheels.

BACKGROUND OF THE INVENTION

The automotive industry, particularly the tire and wheel-rim manufacturers, are intensively working on the problem of developing motor vehicle wheels equipped with pneumatic tires, so-called run-flat wheels, which in case of air loss continue to be drivable for a given distance, although at a reduced speed. Such run-flat wheels typically have a so-called run-flat support body within the pneumatic tire mounted on the wheel rim. This support body has an emergency rolling surface supporting the tire in the event of damage and with its two axially exterior wall sections is propped against the wheel rim with the aid of annular support elements.

Such a run-flat wheel is described in German Laid Open Publications DE 197 07 090 A1 and DE 197 45 409 A1.

Figure 7:
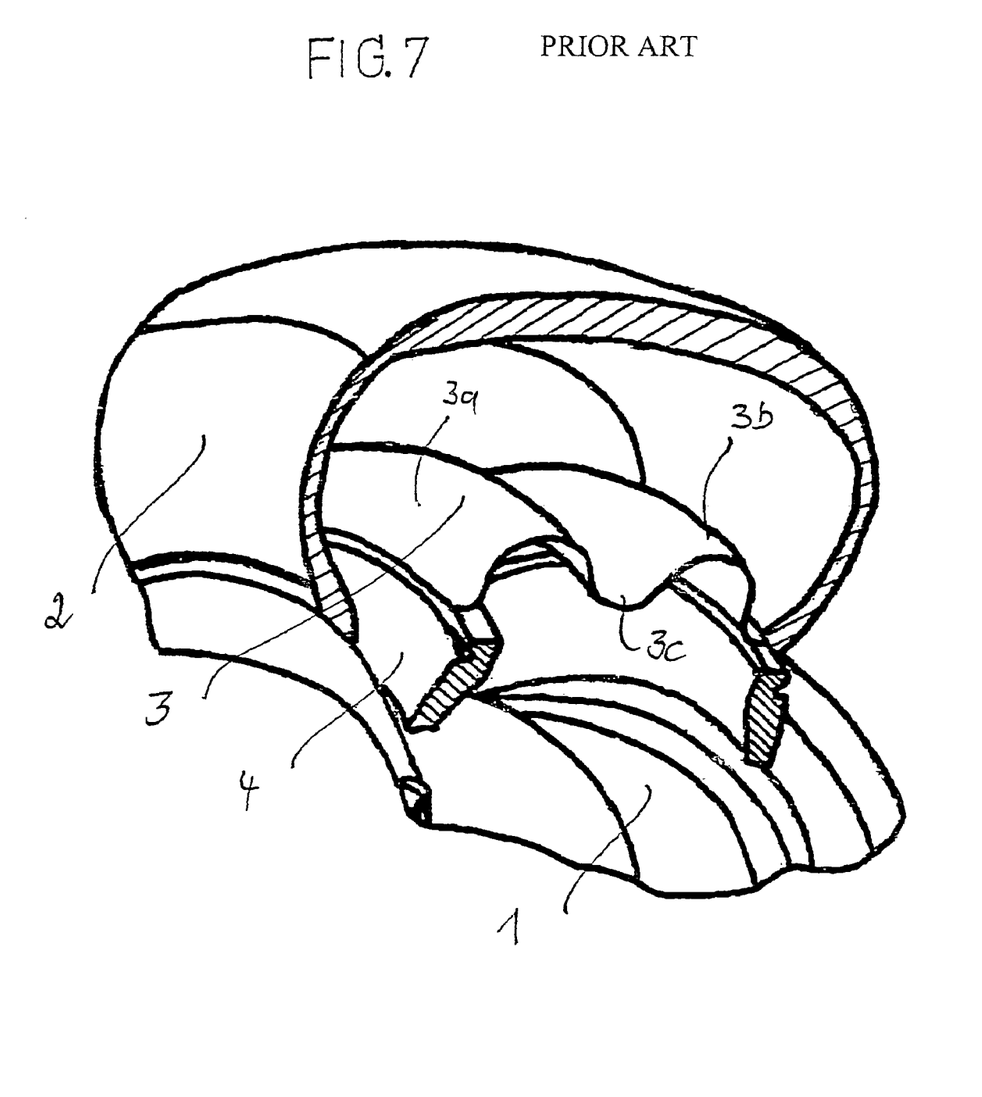
FIG. 7 is a perspective detail view of the internal structure of a run-flat vehicle wheel according to the prior art.

In the case of the prior art, the shell-type annular metal body has an undulated emergency rolling surface with two beads protruding in cross section and a central bead-like indentation. Such a run-flat wheel is illustrated in FIG. 7. This figure shows a perspective detail of a cutaway run-flat wheel with a wheel rim 1 on which a tubeless tire 2 is mounted. In addition, a shell-type annular metal body 3 is mounted on the rim via annular elastomer support elements 4.

The shell-type annular body 3, whose exterior forms the emergency rolling surface in case of air loss, has three annular beads 3a, 3b, 3c, two of which 3a and 3b protrude radially while the third 3c is turned radially inward.

Such a run-flat support body configured as a shell-type closed annular body with an undulated emergency rolling surface must be capable of being mounted inside the tire and together with the tire on the wheel rim and is not easily produced.

SUMMARY OF THE INVENTION

The object of the invention is to provide an effective and relatively simple method for producing such a run-flat support body.

According to the invention, this object is attained by a method for producing a run-flat support body in the form of a shell-type annular metal body with an undulated annular supporting surface for run-flat vehicle wheels, comprising the steps:

Providing a rectangular metal blank with a long side adapted to the circumference of the annular body and a narrow adapted to the width of the annular body, Bending the metal blank along the long side to form an open ring, Welding the ends of the open ring to form a closed annular blank, Profiling the annular surface circumferentially with a cross-sectional undulated profile using a pressure rolling method, Mounting detachably interconnectable connecting elements whose faces lie opposite one another to the profiled annular blank, and Cutting the profiled annular blank between the connecting elements to produce the mountable shell-type annular body with undulated annular supporting surface.

The steps according to the invention make possible an economic production of the run-flat support body for run-flat wheels.

The rectangular blank can be provided in a simple manner by cutting the rectangular blank from a metal strip wound onto a supply reel in a continuous process. The blank is preferably cut using a laser beam. As an alternative, the rectangular blank may also be cut from a sheet metal plate. Stamping may also be used as the cutting method.

To keep the weight as low as possible and to enable the forces to be effectively absorbed during the rolling of the vehicle wheel in an emergency situation, the metal strip used in an embodiment of the invention is high-strength sheet metal.

The ends of the bent blank can in principle be welded using one of the conventional welding processes. To obtain a highly ductile weld area, however, the method is preferably carried out in such a way that the ends of the opening ring are joined by laser welding to form a closed annular blank. TIG/plasma welding can also be used successfully.

Special advantages are achieved if the pressure rolling method is conducted as a two-step process, including a first step in which the annular surface of the annular blank is provided with the undulated profile and a second step in which the diameter of the two edge regions of the profiled ring is reduced.

Separating the cold forming of the annular blank also makes it possible, in particular, to balance in the second step the internal stresses that the annular blank exhibits after the first step.

According to embodiments of the invention, the process is conducted in such a way that in the first step a rotationally symmetrical profiled body, provided with the required undulated profile along its outer circumference, is pressed radially from the inside against the annular surface of the annular blank rotationally clamped along the edges, while an axial force is simultaneously applied, and that the annular body provided with the undulated profile in the first step is rotationally clamped to a second undulated profile body and the edge regions of the annular body are formed and reduced in diameter by means of two disk-shaped rollers.

Conducting the process in this manner requires only a relatively simple construction of the unit from a production engineering point of view.

Mounting the connecting elements to the profiled ring can be done by conventional methods known in the prior art. Resistance welding has proven to be suitable from a production engineering standpoint for attaching the connecting elements to the annular body.

After the connecting elements have been attached, the ring can in principle be cut using any of the conventional methods known in the art. Laser cutting is preferred, however.

BRIEF DESCRIPTION OF THE DRAWING

The invention will now be described in greater detail, by way of example, with reference to an embodiment depicted in the drawings, in which.

DETAILED DESCRIPTION OF THE INVENTION

Figure 1:
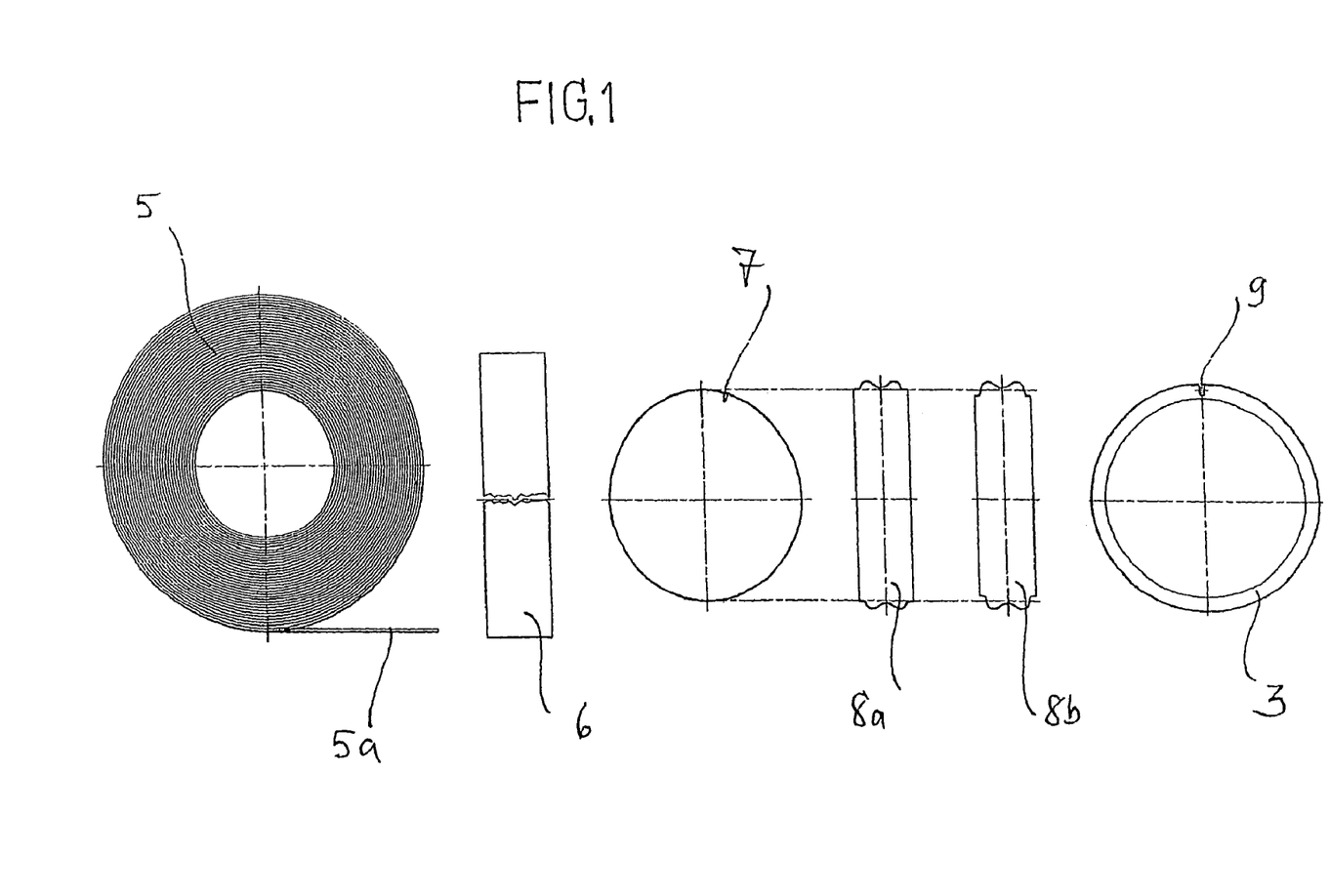
FIG. 1 schematically illustrates the basic sequence of the method according to the invention for producing a ring for a run-flat support body using a two-step pressure rolling method.

FIG. 1 schematically illustrates the basic sequence of the method according to the invention for producing a run-flat support body in the form of a shell-type annular body with an undulated annular supporting surface for run-flat vehicle wheels.

A rectangular blank 6 is cut to length from a metal strip 5a wound onto supply reel 5, preferably by laser beam cutting. In principle, other conventional, e.g. mechanical, cutting methods may also be used. After the rectangular blank 6 has been laser cut, it is bent into an open ring on a three-roller bending machine. The ends are then laser welded, so that a closed ring 7 is obtained. This ring 7 is then profiled, i.e. provided with the undulated annular supporting surface, in two steps 8a, 8b using a pressure rolling method.

After profiling, two connecting elements 9 are attached within the ring by resistance spot welding, and the ring is laser cut between the connecting elements, such that the final ring 3 thus formed can be opened for mounting inside the tire and, respectively, on the wheel rim.

To obtain the necessary stability and strength of the ring 3 while keeping the weight as low as possible, high-strength sheet metal is used as the metallic starting material 5a.

The undulated profiling of the closed ring 7 of the annular blank in the two process steps 8a, 8b is of central importance from a production engineering point of view. This profiling will now be described in greater detail with reference to FIG. 2 to 6.

Figure 2:
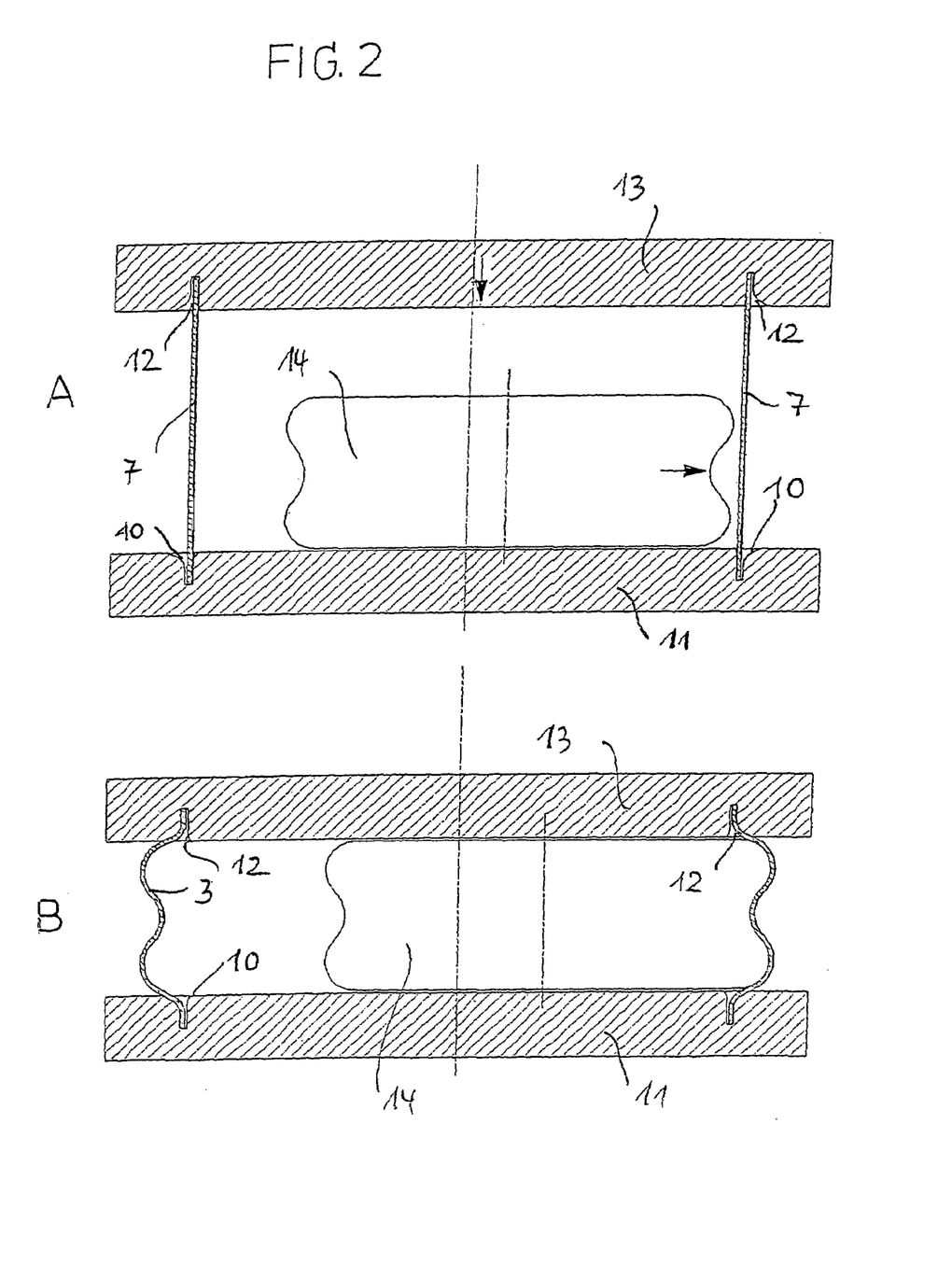
FIG. 2 illustrates in two parts A and B the basic structure of a device for profiling the ring in the first step of the pressure rolling method.

In the first step 8a, partly illustrated schematically in FIG. 2, the lower edge of the horizontally positioned annular blank 7 is inserted into a receiving groove 10 of a horizontal ball-bearing plate 11, which is held down by rollers 11b supported by pedestals 11a. The upper edge of the annular blank 7 is held in an annular groove 12 of a ball-bearing cover 13. This cover 13 can be vertically displaced in the direction of the arrow by a hydraulic cylinder 15. A profile roller 14 driven by a geared motor (not depicted) is installed within the annular blank 7. The entire drive unit including the profile roller can be radially displaced in the direction of the arrow in relation to the annular blank by a separate hydraulic cylinder 15 (not depicted).

Figure 3:
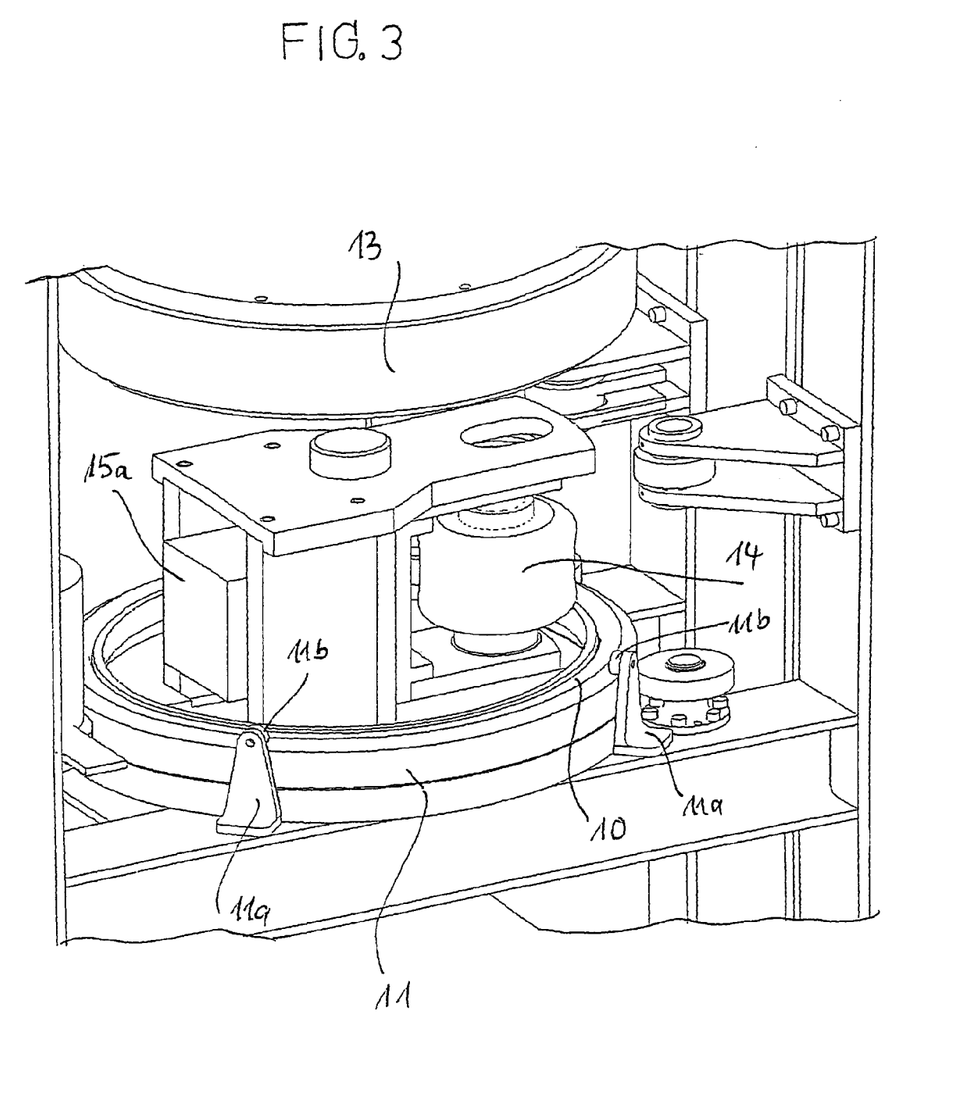
FIG. 3 is a perspective view of the internal structure of a device for carrying out the first step of the pressure rolling method without the clamped ring to be profiled.

The internal structure of the device, illustrated only schematically in FIG. 2A, is shown in a perspective view in FIG. 3, which depicts the device without the inserted annular blank.

Along its circumference the profile roller 14 has the undulated structure that is to be transferred to the annular blank 7 by pressure rolling. For this purpose, as the annular blank 7 together with its holding fixtures 11, 13 is being rotated by a separate drive, the profile roller is pressed against the annular sheet metal blank from the inside by a control unit, such that the profile of the roller is transferred to the sheet metal ring 7, causing the diameter of the ring to be enlarged. To support the forming of the annular blank, the upper hydraulic cylinder applies an axial force to the annular blank through the cover 13.

Figure 4:
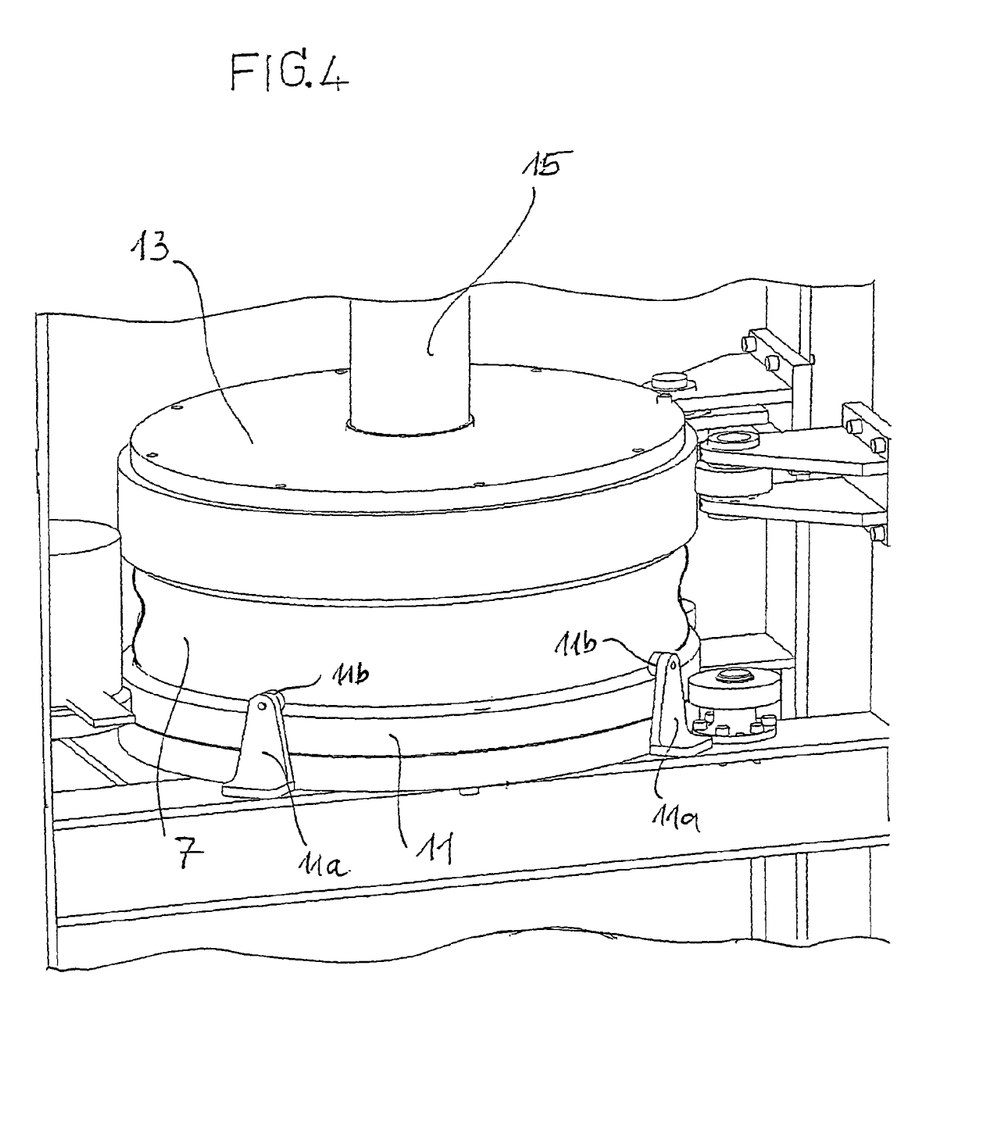
FIG. 4 shows the device according to FIG. 3, but with the clamped ring in the process of being formed.

FIG. 2B illustrates this state schematically. The state of the device according to FIG. 3 during the forming operation is shown in FIG. 4.

In the second step 8b according to FIG. 1, the two edge regions of the profiled ring 7, which later serve to receive the rubber supports in accordance with FIG. 7, are reduced in their diameter.

Figure 5:
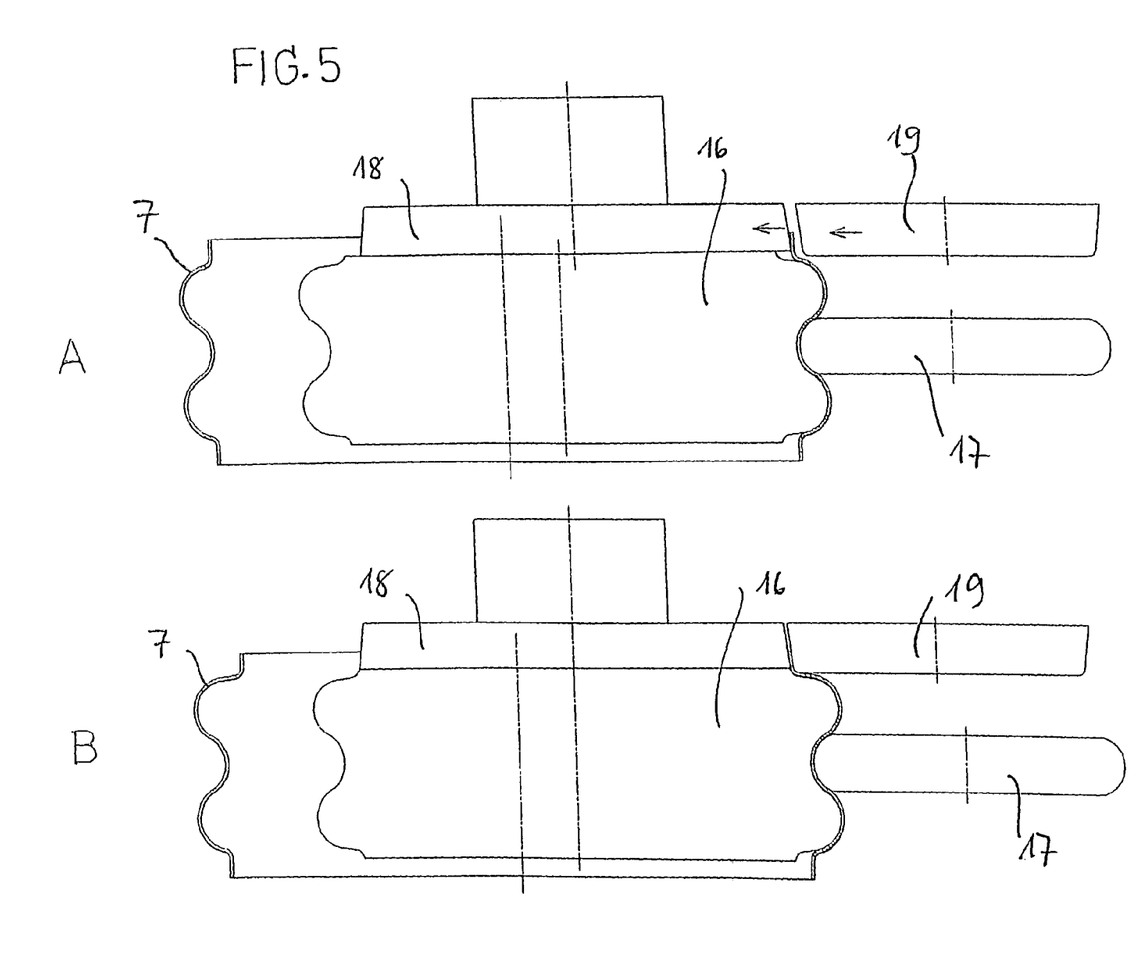
FIG. 5 illustrates in two parts A and B the basic structure of a second device for carrying out the second step of the pressure rolling method to reduce the diameter of the edge regions of the ring profiled in the first step.
Figure 6:
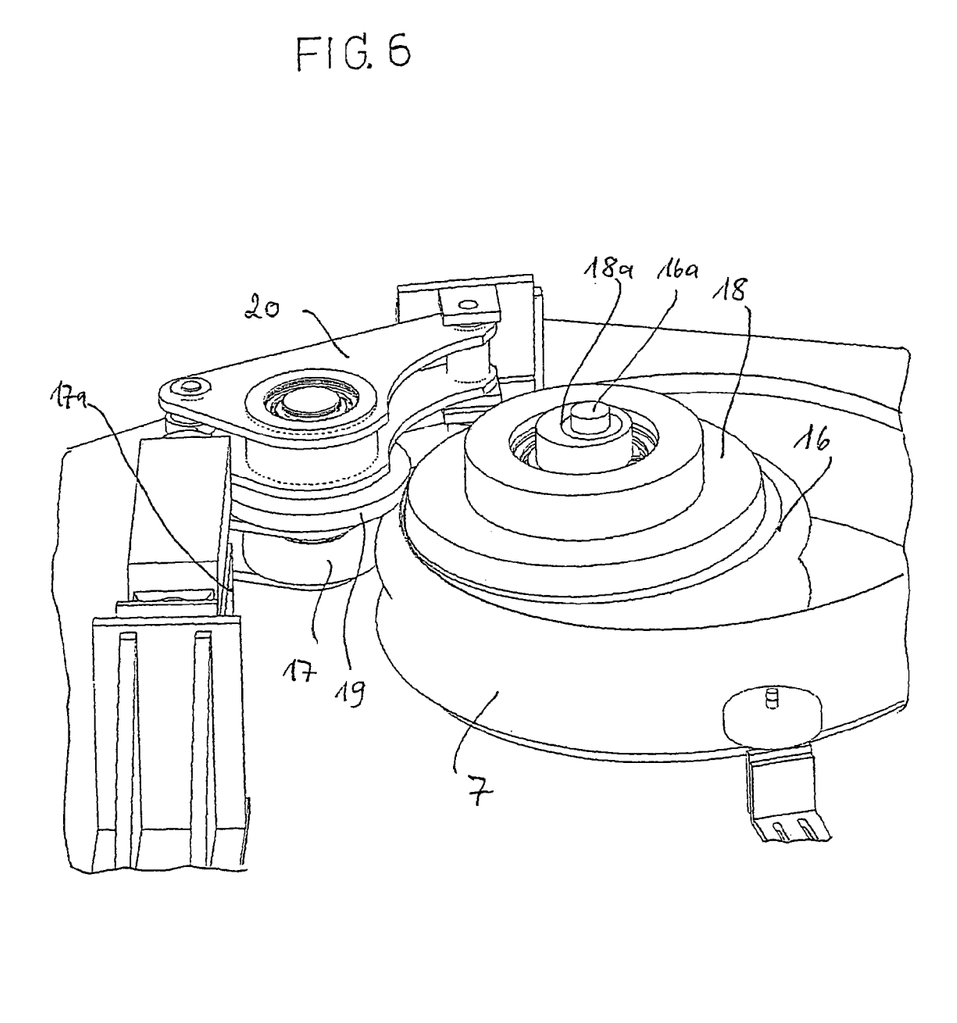
FIG. 6 is a concrete perspective view of the device shown in FIG. 5.

The sequence of this second step is schematically illustrated in FIG. 5, and the corresponding device is shown in FIG. 6.

To reduce the diameter of the edge regions, the profiled ring 7 is placed into a second machine over a profile roller 16 whose diameter is as large as possible. With the aid of a disk-shaped roller 17 it is pressed against this profile roller by a hydraulic cylinder 17a. The profile roller 16 is driven by a hydraulic motor.

The actual forming in this second step occurs between two disk-shaped rollers 18, 19. The larger roller 18 is freely rotatably and eccentrically supported on the shaft 16a of the profile roller 16 via an eccentric disk 18a. The smaller roller 19 is mounted at the same height outside the ring 7 on a rotatably supported arm 20.

The edge of the profile ring 7, which is to be reduced in diameter, is fixed between these two rollers 18, 19. While the profile ring 7 is rotating, the two rollers 18, 19 are moved in the direction of the ring center as indicated by the arrows. To keep the edge of the profile ring continuously fixed between the rollers 18, 19, the inner roller 18 is slowly moved inwardly by the eccentric disk 18a while the outer roller 19 is constantly moved up by a hydraulic cylinder.

This two-step forming operation provides the required profile height of the annular supporting surface as shown FIG. 5B. The two-step forming operation is also necessary, in particular, because the ring, after having been formed on the first machine, has internal stresses that cause it to collapse as the ring is cut open in the last step according to FIG. 1. Dividing the forming operation into two steps causes these inner stresses in the ring to be balanced.

The invention claimed is:

1. A method for producing a run-flat support body in the form of a shell-type, annular metal body with an undulated annular supporting surface for run-flat vehicle wheels, comprising the steps:

providing a rectangular metal blank with a long side adapted to the circumference of the annular body and a narrow side adapted to the width of the annular body, Bending the metal blank along the long side to form an open ring, Welding the ends of the open ring to form a closed annular blank, Profiling the annular surface circumferentially to impart a cross-sectional undulated profile using a pressure rolling method, Mounting detachably interconnectable connecting elements whose faces lie opposite one another to the profiled annular blank, and Cutting the annular blank between the connecting elements to produce the mountable shell-type annular body with the undulated annular supporting surface.

2. The method as claimed in claim 1, wherein each rectangular blank is cut to length from a metal strip wound onto a supply reel in a continuous process.

3. The method as claimed in claim 2, wherein high-strength sheet metal is used as the material for the metal strip.

4. The method as claimed in claim 3, wherein the ends of the opening ring are joined by TIG/plasma welding to form a closed annular blank.

5. The method as claimed in claim 4, wherein the pressure rolling method is carried out as a two-step process, comprising a first step in which the annular surface of the annular blank is provided with the undulated profile and a second step in which the diameter of the two edge regions of the profiled ring is reduced.

6. The method as claimed in claim 5, wherein in the first step, a rotationally symmetrical profile body, provided with the required undulated profile along its outer circumference, is pressed radially against the annular surface of the annular blank, which is rotatably clamped along the edges, while an axial force is simultaneously applied.

7. The method as claimed in claim 6, wherein the annular body provided with the undulated profile in the first step is rotatably clamped on a second undulated profile body and the edge regions of the annular body are formed and reduced in diameter by means of two disk-shaped rollers.

8. The method as claimed in claim 7, wherein the connecting elements are attached to the annular body by resistance spot welding or projection welding.

9. The method as claimed in claim 8, wherein the annular blank is cut by laser cutting after the connecting elements have been attached.

10. The method as claimed in claim 1, wherein the rectangular blank is cut from a sheet metal plate.

11. The method as claimed in claim 10, wherein high-strength sheet metal is used as the sheet metal plate.

12. The method as claimed in claim 11, wherein the blank is cut by laser beam cutting.

13. The method as claimed in claim 12, wherein cutting is effected by stamping.

14. The method as claimed in claim 2, wherein cutting is effected by stamping.

15. The method as claimed in claim 14, wherein the ends of the open ring are joined by laser welding to form a closed annular blank.

16. The method as claimed in claim 2, wherein the blank is cut by laser beam cutting.

17. The method as claimed in claim 1, wherein the pressure rolling method is carried out as a two-step process, comprising a first step in which the annular surface of the annular blank is provided with the undulated profile and a second step in which the diameter of the two edge regions of the profiled ring is reduced.

18. The method as claimed in claim 17, wherein in the first step, a rotationally symmetrical profile body provided with the required undulated profile along its outer circumference, is pressed radially against the annular surface of the annular blank, which is rotatably clamped along the edges, while an axial force is simultaneously applied.

19. The method as claimed in claim 17, wherein the annular body provided with the undulated profile in the first step is rotatably clamped on a second undulated profile body and the edge regions of the annular body are formed and reduced in diameter by means of two disk-shaped rollers.

20. The method as claimed in claim 1, wherein the ends of the open ring are joined by laser welding to form a closed annular blank.

21. The method as claimed in claim 1, wherein the ends of the open ring are joined by TIG/plasma welding to form a closed annular blank.

22. The method as claimed in claim 1, wherein the connecting elements are attached to the annular body by resistance spot welding or projection welding.

23. The method as claimed in any claim 1, wherein the annular blank is cut by laser cutting after the connecting elements have been attached.

* * * * *

UNITED STATES PATENT AND TRADEMARK OFFICE
CERTIFICATE OF CORRECTION

PATENT NO. : 7,313,864 B2 Page 1 of 1
APPLICATION NO. : 10/491604
DATED : January 1, 2008
INVENTOR(S) : Jakob Lowen et al.

It is certified that error appears in the above-identified patent and that said Letters Patent is hereby corrected as shown below:

ON THE TITLE OF THE PATENT:

Item [75] Under the heading "Inventors", the city of residence for the fourth inventor listed should read as follows:

--Drolshagen (DE)--

Signed and Sealed this

Twenty-fourth Day of June, 2008

JON W. DUDAS
*Director of the United States Patent and Trademark Office*